United States Patent [19]
Takahashi et al.

[11] 3,924,935
[45] Dec. 9, 1975

[54] LARGE APERTURE WIDE ANGLE LENS

[75] Inventors: Yasuo Takahashi; Ryota Ogawa, both of Tokyo, Japan

[73] Assignee: Asahi Kogaku Kogyo Kabushiki Kaisha, Tokyo, Japan

[22] Filed: June 28, 1974

[21] Appl. No.: 484,205

[30] Foreign Application Priority Data
July 2, 1973   Japan.............................. 48-74646

[52] U.S. Cl.................. 350/214; 350/176; 350/196
[51] Int. Cl.²........................................ G02B 11/34
[58] Field of Search........................... 350/214, 196

[56] References Cited
UNITED STATES PATENTS
3,512,874   5/1970   Woltche............................. 350/214
3,549,241   12/1970   Mori................................ 350/214 X

*Primary Examiner*—John K. Corbin
*Attorney, Agent, or Firm*—Wolder & Gross

[57] ABSTRACT

A bright 10-element-in-8-group super-wide angle lens has a back focus of at least 1.6f, and includes ten consecutively designated successive lenses, the first lens being a convex lens, the second and third lenses being concave meniscus lenses, the fourth lens being a concave meniscus lens cemented to the fifth convex lens to form a doublet, the sixth lens being a convex lens, the seventh lens being a concave lens cemented to the eighth convex lens to form a negative doublet, the ninth lens being a convex meniscus lens and the tenth lens being a convex lens. The focal length of the lens system, as well as the focal length, radius of curvature, index of refraction and Abbe number of certain of the lens elements are selected to fall within designated maximum and minimum parameters to provide low aberration and optimum brightness.

2 Claims, 10 Drawing Figures

FIG. 1
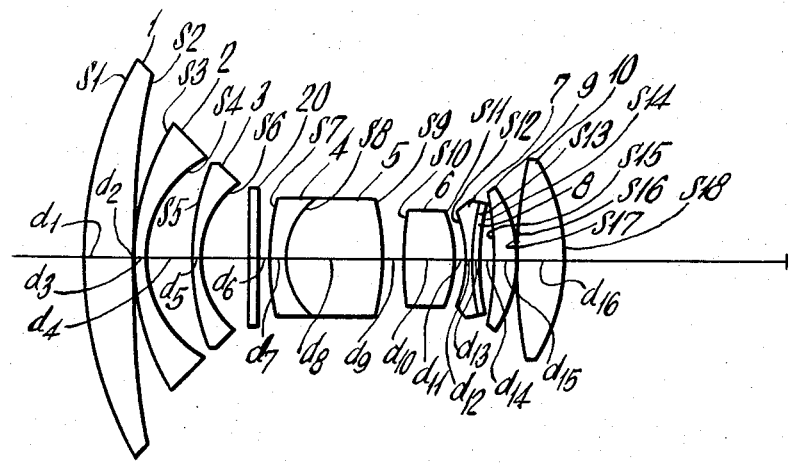
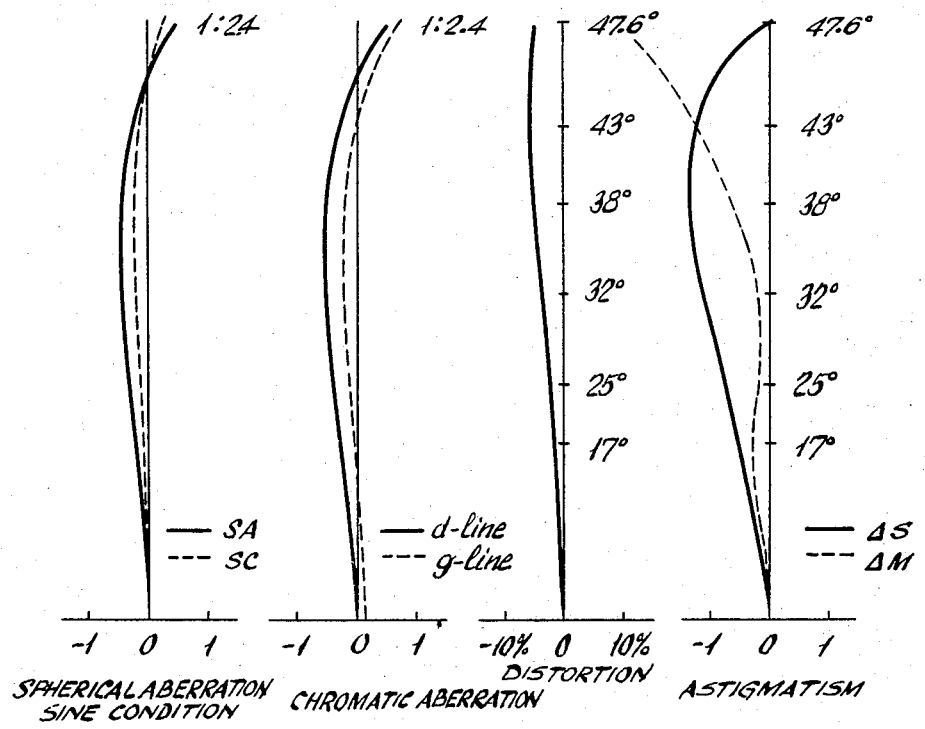
FIG. 2A    FIG. 2B    FIG. 2C    FIG. 2D

| FIG. 4A | FIG. 4B | FIG. 4C | FIG. 4D |
| --- | --- | --- | --- |
| SPHERICAL ABERRATION SINE CONDITION | CHROMATIC ABERRATION | DISTORTION | ASTIGMATISM |

3,924,935

LARGE APERTURE WIDE ANGLE LENS

BACKGROUND OF THE INVENTION

The present invention relates to improvements in lenses, and in particular to an improved wide angle lens system of the retrofocus type.

In recent years, remarkable developments have been made in wide angle lenses and great progress has been realized, particularly in the manufacture of retrofocus type super-wide angle bright lenses. Nevertheless because of the wide-angle characteristics of such lens systems, the systems are usually subject to high distortion and high aberration, and lack the desired brightness.

It is an object of the present invention to provide an improved wide angle lens system of the retrofocus type having a greatly increased brightness in the wide angular range.

Another object of the invention is the provision of a wide angle lens system of the character described which has low aberration properties and is relatively free from distortion.

SUMMARY OF THE INVENTION

In accordance with the invention there is provided a bright 10-element-in-8-group super-wide angle lens with minimum aberration, having a back focus of 1.6f or greater, and satisfying each of the following conditions (1) to (5) inclusive:

$$F/0.95 < |F_{1,2,3}| < F/0.6, \quad F_{1,2,3} < 0 \tag{1}$$
$$|F_{1,2,3,4,5}| > F/0.25 \tag{2}$$
$$1 < r_{11}/r_{12} < 1.5 \tag{3}$$
$$0.4 > n_7 - n_8 > 0.1 \tag{4}$$
$$50 < \nu 8 + \nu 9 + \nu 10/3 < 70 \tag{5}$$

Additional objects and advantages of the invention will become apparent in the course of the following specification when taken in connection with the accompanying drawings, in which:

BRIEF DESCRIPTION OF THE DRAWING

FIG. 1 is a schematic elevational view of a wide angle lens system embodying the present invention, in one embodiment thereof;

FIGS. 2(A), 2(B), 2(C) and 2(D) are a series of comparative graphs illustrating the curves of the lens system of FIG. 1 with respect to various types of aberration;

FIGS. 4(A), 4(B), 4(C) and 4D are a series of comparative graphs illustrating the various aberration curves obtained by the lens system of FIG. 2.

DETAILED DESCRIPTION OF THE INVENTION

Figure 3:
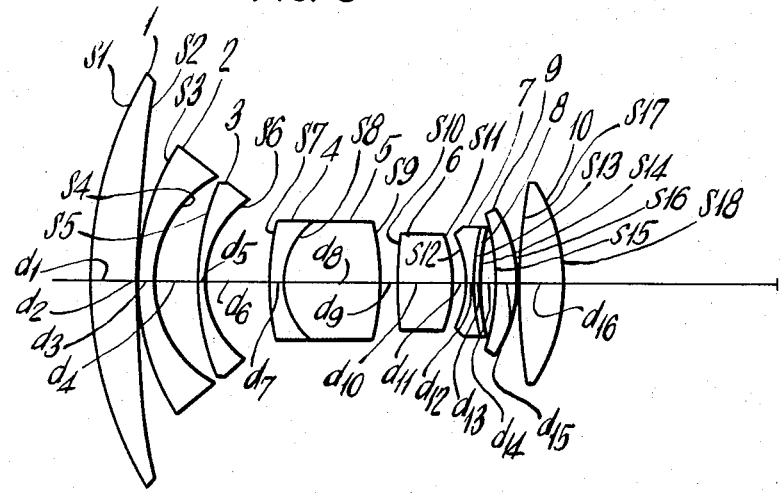
FIG. 3 is a schematic elevational view similar to FIG. 1, but showing a modified embodiment of wide angle lens system in accordance with the present invention.
Figure 3:
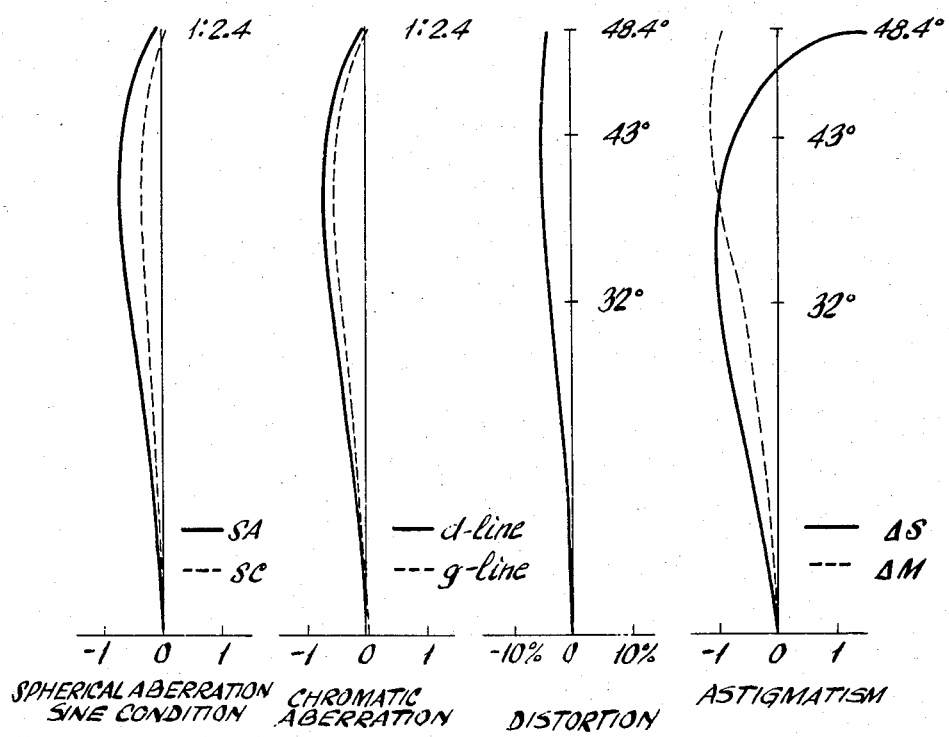

Referring in detail to the drawings, and in particular to FIG. 1, there is shown a wide angle lens system constituting a preferred embodiment of the invention. The reference numerals 1, 2, 3, 4, 5, 6, 7, 8, 9, and 10 consecutively designate the first to the tenth lenses respectively from the rear lens 1 to the front lens 10.

The first lens 1 is a convex lens having a surface S1 which faces toward the subject to be photographed, and an opposed surface S2. The surface S1 has a greater radius $r_1$ than the radius of curvature $r_2$ of the surface S1. The lens 1 has a thickness $d_1$ and an index of refraction designated $n_1$ hereinafter. from the The second lens 2 and the third lens 3 are both concave meniscus lenses. Lens 2 has a surface S3 which faces the image and has a radius of curvature $r_3$ greater than the radius of curvature $r_4$ of the opposite surface S4. The lens 2 has a thickness $d_3$ and a refractive index designated $n_2$. The surface S3 is spaced a distance $d_2$ from the surface S2 of lens 1. Lens 3 has a surface S5 which faces the image and has a radius of curvature $r_5$ greater than the radius of curvature $r_6$ of the opposite surface S6. The lens 3 has a thickness $d_5$, and its surface S5 is spaced a distance $d_4$ from the surface S4 of lens 2. Inwardly of the second and third lenses is arranged a filter 20 which, in this embodiment, is not included in the number of lenses.

The fourth lens 4 is a concave meniscus lens having a surface S7 of smaller radius of curvature $r_7$ than the opposite face thereof, the latter face being cemented to the confronting face of the fifth lens 5 to define a single surface S8 of the doublet unit subsystem so formed. The surface S8 has a radius of curvature $r_8$. The fourth lens 4 has an index of refraction $n_4$ and a thickness $d_7$, and its surface S7 is spaced a distance $d_6$ from the surface S6 of lens 3. The fifth lens 5 is a convex lens having a non-cemented surface S9 of radius of curvature $r_9$, a thickness $d_8$, and an index of refraction $n_5$.

The sixth lens 6 is a convex lens with opposed surfaces S10 and S11, a thickness $d_{10}$, and an index of refraction $n_6$. The surface S10 is spaced by a distance $d_9$ from the surface S9 of lens 5, a diaphragm being interposed in this spacing between lenses 5 and 6. The seventh concave lens 7 and the eighth convex lens 8 are cemented together at their complementary faces, defining a surface S13 to form a negative doublet lens component. The seventh lens 7 has an outer surface S12, a thickness $d_{12}$ and a refractive index $n_7$. The surface S12 is spaced a distance $d_{11}$ from surface S11 of lens 6. The eighth lens 8 has an outer surface S14 a thickness $d_{13}$ and a refractive index $n_8$.

The ninth lens 9 is a convex meniscus lens having a surface S15 facing toward the image and being of a large radius of curvature $r_{15}$ than the radius of curvature $r_{16}$ of its opposite surface S16. The lens 9 has a thickness $d_{15}$, a refractive index $n_9$, and its surface S15 is spaced a distance $d_{14}$ from the surface S14 of lens 8.

The tenth lens 10 is a convex lens having opposed surfaces S17 and S18, a thickness $d_{17}$, and a refractive index $n_{10}$. The surface S17 is spaced a distance $d_{16}$ from the surface S16 of lens 9. The Abbe numbers of the lenses 1, 2, 3, 4, 5, 6, 7, 8, 9, and 10 are respectively designated $V_1$, $V_2$, $V_3$, $V_4$, $V_5$, $V_6$, $V_7$, $V_8$, $V_9$, and $V_{10}$.

FIG. 3 illustrates a modified embodiment of wide angle lens system constituting ten lenses of similar construction and arrangement as the lenses of the previous embodiment, and again designated respectively as lenses 1, 2, 3, 4, 5, 6, 7, 8, 9 and 10. The previous description of the embodiment of FIG. 1 applies equally to the embodiment of FIG. 3, except that the filter 20 is eliminated. The specific quantitative details of the lens elements of FIG. 3 differ from those of the embodiment of FIG. 1 as will be presently set forth in detail.

The wide angle lens systems illustrated in both FIG. 1 and FIG. 3 are made to satisfy the following conditions (1) through (5) inclusive:

$$F/0.95 < |F_{1,2,3}| < F/0.6, \quad F_{1,2,3} < 0 \tag{1}$$
$$F_{1,2,3,4,5} > F/0.25 \tag{2}$$
$$1 < r_{11}/r_{12} < 1.5 \tag{3}$$
$$0.4 > n_7 - n_8 > 0.1 \tag{4}$$
$$50 < \nu 8 + \nu 9 + \nu 10/3 < 70 \tag{5}$$

wherein:

F is the combined focal length of entire system,
$F_{1,2,...,i}$ is the composite focal length of lenses 1 to $i$,
$n_i$ is the refractive index in $d$-line of the $i$th lens,
$\nu_i$ is the Abbe number of $i$th lens,
$d_j$ is the spacing or lens thickness between the $j$th surface and the $(j+1)$th surface, and
$r_k$ is the radius of curvature of the $k$th lens.

The functions and applications of the conditions (1) to (5), designated above, to be satisfied by the lens systems of the present invention are described in detail as follows:

Condition (1):

It is evident that in a wide angle retrofocus lens, the front lens group has a negative focal length. When $F_{1,2,3}$ is a negative value shorter than $F/0.95$, the lens can cover a wide angle but cannot have a sufficient brightness due to aberrations developed at various lens surfaces. In particular, such an arrangement gives rise to an inferior comatic aberration. When the front lens group has a focal length longer than $F/0.6$, the aberrations are decreased to some extent. However, to obtain a back focus longer than the intended value, the rear lens group has to be constructed in a somewhat unnatural manner, thereby increasing the degree of aberrations. Further, a wide angle cannot be covered without increasing the lens size.

Condition (2):

A positive lens must be introduced to desirably control the chromatic aberration in a wide angular range. In addition to condition (1), the proper focal length range of the front lens group must be satisfied. When the focal length $F_{1,2,3,4,5}$ is negative and shorter than $F/0.25$, the sixth positive lens must compensate for this. Accordingly the sixth lens will provide an increased aberration, losing the balance. On the contrary, when $F_{1,2,3,4,5}$ is positive and shorter than $F/0.25$, the lens surfaces S7 to S9 have to bear an increased burden, thereby developing aberrations and adversely influencing the back focus. As a result, an increased burden will be applied to the rear lens group.

Condition (3):

This condition represents a relationship between $r_{11}$ and $r_{12}$ which has a delicate influence over the aberration balance. This condition is essential for maintaining, especially, the balance in spherical aberration. When $r_{11}$ is either equal to $r_{12}$ or has a larger absolute value, the spherical aberration will increase excessively in the positive direction so that it can hardly be covered by any other lens surfaces. For example, trying to compensate the spherical aberration at the lens surface S14 is essentially impractical, because this will increase the comatic aberration excessively. Conversely, when $r_{11}/r_{12}$ exceeds 1.5, an inner comatic aberration will readily be developed with a light ray having a comparatively small incident angle. It is difficult to correct such an inner comatic aberration at the other lens surfaces.

Condition (4):

This is a condition for correcting the comatic aberration. When $n_7$ exceeds 0.4 and is larger than $n_8$, it becomes difficult to balance the outer coma developed at the lens surface S14 in the range from comparatively small to larger incident angles. This naturally is associated with $r_{13}$ and $d_{13}$. Conversely, when $n_7$ exceeds $n_8$ by a value smaller than 0.1, the chromatic aberration cannot be corrected and it becomes meaningless for the lenses to be cemented together.

Condition (5):

This is a condition for controlling and correcting the chromatic aberration developed at various lenses including the seventh one. When $$\frac{\nu 8 + \nu 9 + \nu 10}{3}$$

is smaller than 50, the chromatic aberration can be corrected only imperfectly. To eliminate this advantage the seventh lens must bear an excessive burden. However, this will have an adverse influence over the characteristics of the seventh lens to a large extent, because this lens has an influence of great importance over the balance in aberration as is defined by conditions (3) and (4). On the other hand, when $$\frac{\nu 8 + \nu 9 + \nu 10}{3}$$

exceeds 70, the intended effect cannot be attained because various disadvantages will appear in various aberrations due to a small refractive index of the lens material.

The invention will be more fully understood with reference to the following Table I which sets forth, by way of illustration, a specific example of the lens system shown in the first embodiment of FIG. 1. This table gives selected values of the radii of curvatures $r_1$ through $r_{18}$ of each of the lens surfaces S1 to S18, the distances $d_1$ to $d_{17}$ between each surface and the next successive surface, the $d$-line refractive index $n_1$ to $n_{10}$ of each of the lenses, and the Abbe number $\nu_1$ to $\nu_{10}$ of each of the lenses. The lens system in this example has a focus $F = 100$, 1:2.4, the focal length $F_{1,2,3}$ of the first three lenses is given as $-120.409$, and the focal length $F_{1,2,3,4,5}$ of the first five lenses is given as $-1589.825$.

TABLE I

| $F = 100$ , 1:2.4 | | Angle of view | $2\omega = 95.20$ |
|---|---|---|---|
| $r_1 = 326.282$ | $d_1 = 40.61$ | $n_1 = 1.64000$ | $\nu_1 = 60.2$ |
| $r_2 = 949.626$ | $d_2 = 0.49$ | | |
| $r_3 = 207.067$ | $d_3 = 9.98$ | $n_2 = 1.78590$ | $\nu_2 = 44.2$ |
| $r_4 = 88.291$ | $d_4 = 38.62$ | | |
| $r_5 = 230.832$ | $d_5 = 5.99$ | $n_3 = 1.58913$ | $\nu_3 = 61.1$ |
| $r_6 = 80.421$ | $d_6 = 50.89$ | | |
| Filter thickness | 7.30 | | |
| $r_7 = 276.609$ | $d_7 = 11.59$ | $n_4 = 1.75700$ | $\nu_4 = 47.9$ |
| $r_8 = 60.873$ | $d_8 = 78.01$ | $n_5 = 1.74950$ | $\nu_5 = 35.2$ |
| $r_9 = -349.170$ | $d_9 = 20.89$ | | |
| $r_{10} = 740.533$ | $d_{10} = 39.45$ | $n_6 = 1.65160$ | $\nu_6 = 58.6$ |
| $r_{11} = -100.524$ | $d_{11} = 10.47$ | | |
| $r_{12} = -81.327$ | $d_{12} = 4.97$ | $n_7 = 1.80518$ | $\nu_7 = 25.4$ |
| $r_{13} = 228.884$ | $d_{13} = 7.50$ | $n_8 = 1.48749$ | $\nu_8 = 70.1$ |
| $r_{14} = 340.745$ | $d_{14} = 9.88$ | | |
| $r_{15} = -409.070$ | $d_{15} = 21.91$ | $n_9 = 1.51633$ | $\nu_9 = 64.1$ |
| $r_{16} = -104.702$ | $d_{16} = 0.49$ | | |

TABLE I-continued $r_{17} = 598.995$   $d_{17} = 36.08$   $n_{10} = 1.77250$   $\nu_{10} = 49.6$
$r_{18} = -162.162$
$F_{1.2.3} = -120.409$
$F_{1.2.3.4.5} = -1589.825$ In addition, the following Table II sets forth Seidel's coefficients for each of the lens surfaces S1 to S18 of the lens system illustrated in FIG. 1:

TABLE II

| Number of lens surface | I | II | III | P | V |
|---|---|---|---|---|---|
| S1 | 0.007 | 0.013 | 0.024 | 0.120 | 0.279 |
| S2 | 0.000 | −0.002 | 0.066 | −0.041 | −0.857 |
| S3 | 0.002 | 0.005 | 0.011 | 0.213 | 0.478 |
| S4 | −0.843 | 0.186 | −0.041 | −0.498 | 0.119 |
| S5 | 0.197 | 0.119 | 0.072 | 0.161 | 0.141 |
| S6 | −3.896 | 0.514 | −0.068 | −0.461 | 0.070 |
|  | 0.453 | 0.257 | 0.145 | 0.000 | 0.082 |
| Filter |  |  |  |  |  |
|  | −0.466 | −0.264 | −0.150 | 0.000 | −0.085 |
| S7 | 2.012 | 0.506 | 0.127 | 0.156 | 0.071 |
| S8 | −0.270 | 0.018 | −0.001 | −0.004 | 0.000 |
| S9 | 0.026 | −0.035 | 0.048 | 0.123 | −0.231 |
| S10 | 0.015 | 0.029 | 0.057 | 0.053 | 0.215 |
| S11 | 17.527 | −1.434 | 0.117 | 0.392 | −0.042 |
| S12 | −21.535 | 0.924 | −0.040 | −0.548 | 0.025 |
| S13 | −0.680 | −0.367 | −0.199 | −0.052 | −0.135 |
| S14 | −1.600 | −1.033 | −0.667 | −0.096 | −0.493 |
| S15 | 0.110 | 0.179 | 0.291 | −0.083 | 0.337 |
| S16 | 1.732 | −0.099 | 0.006 | 0.325 | −0.019 |
| S17 | 0.059 | 0.087 | 0.128 | 0.073 | 0.297 |
| S18 | 8.200 | 0.579 | 0.041 | 0.269 | 0.022 |
| SUM | 1.048 | 0.180 | −0.030 | 0.100 | 0.275 |

The following Table III sets forth, by way of illustration, a specific example of lens system shown in the second embodiment of FIG. 3. The values given are of the same type as in Table 1, and in this example the lens system is shown as having a focus of $F = 100$, 1:2.4, but with an increased angle of view. In this instance, the focal length of the first three lenses is given as −120.642, and the focal length of the first five lenses is given as −1515.152.

TABLE III $F = 100$,  1:2.4     Angle of view   $2\omega = 96.80$

| | | |
|---|---|---|
| $r_1 = 316.035$ | $d_1 = 40.70$ | $n_1 = 1.64100$   $\nu_1 = 56.9$ |
| $r_2 = 860.727$ | $d_2 = 0.50$ | |
| $r_3 = 192.992$ | $d_3 = 10.00$ | $n_2 = 1.78800$   $\nu_2 = 47.5$ |
| $r_4 = 85.423$ | $d_4 = 38.70$ | |
| $r_5 = 224.740$ | $d_5 = 6.00$ | $n_3 = 1.58913$   $\nu_3 = 61.1$ |
| $r_6 = 79.827$ | $d_6 = 54.40$ | |
| $r_7 = 273.245$ | $d_7 = 11.60$ | $n_4 = 1.75500$   $\nu_4 = 52.5$ |
| $r_8 = 76.470$ | $d_8 = 78.15$ | $n_5 = 1.74950$   $\nu_5 = 35.2$ |
| $r_9 = -358.257$ | $d_9 = 16.05$ | |
| $r_{10} = 742.100$ | $d_{10} = 45.35$ | $n_6 = 1.65160$   $\nu_6 = 58.6$ |
| $r_{11} = -99.663$ | $d_{11} = 10.00$ | |
| $r_{12} = -81.765$ | $d_{12} = 6.00$ | $n_7 = 1.80518$   $\nu_7 = 25.4$ |
| $r_{13} = 243.745$ | $d_{13} = 6.00$ | $n_8 = 1.48749$   $\nu_8 = 70.1$ |
| $r_{14} = 307.472$ | $d_{14} = 9.90$ | |
| $r_{15} = -409.540$ | $d_{15} = 21.95$ | $n_9 = 1.56873$   $\nu_9 = 63.1$ |
| $r_{16} = -112.317$ | $d_{16} = 0.50$ | |
| $r_{17} = 577.870$ | $d_{17} = 36.15$ | $n_{10} = 1.77250$   $\nu_{10} = 49.6$ |
| $r_{18} = -160.725$ | | |
| $F_{1.2.3} = -120.642$ | | |
| $F_{1.2.3.4.5} = -1515.152$ | | |

The following Table IV sets forth the Seidel's coefficients for each of the lens surfaces S1 to S18 of the lens system illustrated in FIG. 3.

TABLE IV

| Number of lens surface | I | II | III | P | V |
|---|---|---|---|---|---|
| S1 | 0.008 | 0.014 | 0.025 | 0.124 | 0.269 |
| S2 | 0.000 | −0.001 | 0.062 | −0.045 | −0.847 |
| S3 | 0.004 | 0.007 | 0.013 | 0.228 | 0.446 |
| S4 | −0.894 | 0.216 | −0.052 | −0.516 | 0.137 |
| S5 | 0.203 | 0.120 | 0.070 | 0.165 | 0.138 |
| S6 | −3.892 | 0.521 | −0.070 | −0.464 | 0.071 |
| S7 | 1.978 | 0.496 | 0.124 | 0.157 | 0.071 |
| S8 | −0.104 | 0.004 | −0.000 | −0.002 | 0.000 |
| S9 | 0.021 | −0.031 | 0.045 | 0.120 | −0.237 |
| S10 | 0.015 | 0.029 | 0.058 | 0.053 | 0.217 |
| S11 | 16.882 | 1.486 | 0.131 | 0.396 | −0.046 |
| S12 | −20.460 | 1.054 | −0.052 | −0.546 | 0.030 |

TABLE IV-continued

| Number of lens surface | I | II | II | P | V |
|---|---|---|---|---|---|
| S13 | −0.556 | −0.317 | −0.180 | −0.049 | −0.130 |
| S14 | −1.682 | −1.070 | −0.680 | −0.107 | −0.500 |
| S15 | 0.112 | 0.186 | 0.306 | −0.089 | 0.359 |
| S16 | 1.314 | 0.125 | 0.012 | 0.323 | −0.032 |
| S17 | 0.060 | 0.089 | 0.131 | 0.075 | 0.304 |
| S18 | 8.001 | 0.520 | 0.034 | 0.271 | 0.020 |
| SUM | 1.011 | 0.204 | −0.024 | 0.095 | 0.271 |

The highly superior optical characteristics and performance of the lens system of FIG. 1, having the values designated in Table I, are shown in the group of aberration curves illustrated in FIGS. 2(A), 2(B), 2(C) and 2(D). Similarly the optical characteristics of the lens system of FIG. 3, having the values designated in Table III, are shown in the group of aberration curves illustrated in FIGS. 4(A), 4(B), 4(C) and 4(D).

While preferred embodiments of the invention have been shown and described herein, it is obvious that numerous changes, omissions and additions may be made in such embodiments without departing from the spirit and scope of the invention.

What is claimed is:

1. A wide angle lens system including ten lenses consecutively successively designated from the front to the rear, the lens surfaces being consecutively successively designated, with cemented faces defining a single surface and a filter interposed between the third lens and the fourth lens, said lens system possessing the following dimensions and values:

| | | | |
|---|---|---|---|
| $r_1 = 326.282$ | $d_1 = 40.61$ | $n_1 = 1.64000$ | $\nu_1 = 60.2$ |
| $r_2 = 949.626$ | $d_2 = 0.49$ | | |
| $r_3 = 207.067$ | $d_3 = 9.98$ | $n_2 = 1.78950$ | $\nu_2 = 44.2$ |
| $r_4 = 88.291$ | $d_4 = 38.62$ | | |
| $r_5 = 230.832$ | $d_5 = 5.99$ | $n_3 = 1.58913$ | $\nu_3 = 61.1$ |
| $r_6 = 80.421$ | $d_6 = 50.89$ | | |
| Filter thickness | 7.30 | | |
| $r_7 = 276.609$ | $d_7 = 11.59$ | $n_4 = 1.75700$ | $\nu_4 = 47.9$ |
| $r_8 = 60.873$ | $d_8 = 78.01$ | $n_5 = 1.74950$ | $\nu_5 = 35.2$ |
| $r_9 = -349.170$ | $d_9 = 20.89$ | | |
| $r_{10} = 740.533$ | $d_{10} = 39.45$ | $n_6 = 1.65160$ | $\nu_6 = 58.6$ |
| $r_{11} = -100.524$ | $d_{11} = 10.47$ | | |
| $r_{12} = -81.327$ | $d_{12} = 4.97$ | $n_7 = 1.80518$ | $\nu_7 = 25.4$ |
| $r_{13} = 228.884$ | $d_{13} = 7.50$ | $n_8 = 1.48749$ | $\nu_8 = 70.1$ |
| $r_{14} = 340.745$ | $d_{14} = 9.88$ | | |
| $r_{15} = -409.070$ | $d_{15} = 21.91$ | $n_9 = 1.51633$ | $\nu_9 = 64.1$ |
| $r_{16} = -104.702$ | $d_{16} = 0.49$ | | |
| $r_{17} = 598.995$ | $d_{17} = 36.08$ | $n_{10} = 1.77250$ | $\nu_{10} = 49.6$ |
| $r_{18} = -162.162$ | | | | wherein $rj$ is the radius of curvature of the $j$th lens surface, $dj$ is the axial distance between the $j$th lens surface and the $(j + 1)$th surface, $n_i$ is the refractive index of the $i$th lens and $\nu i$ is the Abbe number of the $i$th lens, the fourth and fifth lenses being cemented at their mating confronting faces to form a first doublet and the seventh and eighth lenses being cemented at their mating confronting faces to form a second doublet.

2. A wide angle lens system including ten lenses consecutively successively designated from the front to the rear, the lens surfaces being consecutively successively designated with cemented faces defining a single surface said lens system possessing the following dimensions and values:

| | | | |
|---|---|---|---|
| $r_1 = 316.035$ | $d_1 = 40.70$ | $n_1 = 1.64100$ | $\nu_1 = 56.9$ |
| $r_2 = 860.727$ | $d_2 = 0.50$ | | |
| $r_3 = 192.992$ | $d_3 = 10.00$ | $n_2 = 1.78800$ | $\nu_2 = 47.5$ |
| $r_4 = 85.423$ | $d_4 = 38.70$ | | |
| $r_5 = 224.740$ | $d_5 = 6.00$ | $n_3 = 1.58913$ | $\nu_3 = 61.1$ |
| $r_6 = 79.827$ | $d_6 = 54.40$ | | |
| $r_7 = 273.245$ | $d_7 = 11.60$ | $n_4 = 1.75500$ | $\nu_4 = 52.5$ |
| $r_8 = 76.470$ | $d_8 = 78.15$ | $n_5 = 1.74950$ | $\nu_5 = 35.2$ |
| $r_9 = -358.257$ | $d_9 = 16.05$ | | |
| $r_{10} = 742.100$ | $d_{10} = 45.35$ | $n_6 = 1.65160$ | $\nu_6 = 58.6$ |
| $r_{11} = -99.663$ | $d_{11} = 10.00$ | | |
| $r_{12} = -81.765$ | $d_{12} = 6.00$ | $n_7 = 1.80518$ | $\nu_7 = 25.4$ |
| $r_{13} = 243.745$ | $d_{13} = 6.00$ | $n_8 = 1.48749$ | $\nu_8 = 70.1$ |
| $r_{14} = 307.472$ | $d_{14} = 9.90$ | | |
| $r_{15} = -409.540$ | $d_{15} = 21.95$ | $n_9 = 1.56873$ | $\nu_9 = 63.1$ |
| $r_{16} = -112.317$ | $d_{16} = 0.50$ | | |
| $r_{17} = 577.870$ | $d_{17} = 36.15$ | $n_{10} = 1.77250$ | $\nu_{10} = 49.6$ |
| $r_{18} = -160.725$ | | | | wherein $rj$ is the radius of curvature of the $j$th lens surface, $dj$ is the axial distance between the $j$th lens surface and the $(j + 1)$ lens surface, $n_i$ is the refractive index of the $i$th lens and $\nu i$ is the Abbe number of the $i$th lens, the fourth and fifth lenses being cemented at their mating confronting faces to form a first doublet and the seventh and eighth lenses being cemented at their mating confronting faces to form a second doublet.

* * * * *